Patented Dec. 29, 1942

2,306,650

UNITED STATES PATENT OFFICE 2,306,650

PROCESS FOR REFINING POLYMERIZED ROSIN

William N. Traylor and Clell E. Tyler, Hattiesburg, Miss., assignors to Hercules Powder Company, Wilmington, Del., a corporation of Delaware No Drawing. Application April 10, 1940, Serial No. 328,865

16 Claims. (Cl. 260—111)

This invention relates to polymerized rosins and more particularly to a process for refining polymerized rosins.

Rosin, because of its low cost and abundant sources of supply, is a product of great commercial significance, especially in the protective coating industry, in the manufacture of synthetic resins, in the sizing of paper, etc. Ordinary rosin, however, whether it is derived from the living tree and known as gum rosin, or whether it is derived, for example, from stump wood, and known as wood rosin, is a product of relatively low melting point. This latter property of rosin has militated against its use in some of the fields mentioned.

Several methods have been described for effecting an increase in the melting point of rosin. Thus, for example, in one method a gasoline solution of rosin is treated with sulfuric acid under certain specific conditions to polymerize the rosin and thereby increase its melting point. In another process the polymerization is carried out on the rosin dissolved in a monocyclic aromatic hydrocarbon, utilizing sulfuric acid as the polymerizing agent.

After rosin has been polymerized, such as, for example, by either of the above processes or by any other procedure, its color is not usually satisfactory for most purposes. The known procedures for refining rosin have proved unsatisfactory for the refining of polymerized rosin for the reason that they do not satisfactorily improve the color and for the very objectionable reason that they exhibit a definite tendency to decrease the melting-point of the polymerized rosin, thereby defeating the original purpose of the polymerizing treatment. Furthermore a decrease in yield is generally encountered.

It is an object of this invention to provide an improved process for refining polymerized rosin.

It is a further object to provide an improved process for refining polymerized rosin which is extremely simple and economical.

It is a still further object to provide a process for refining polymerized rosin which will provide a refined product in a substantially quantitative yield based on the polymerized rosin treated.

It is another object to provide a process for refining polymerized rosin which will provide a refined product having a melting point at least as high as the original polymerized rosin without a sacrifice in yield.

Other objects of the invention will appear hereinafter.

The above objects are accomplished in accordance with this invention by treating polymerized rosin with nascent hydrogen. The treatment is carried out under conditions which will provide intimate contact between the polymerized rosin and the nascent hydrogen. As a result the color of the polymerized rosin becomes substantially lightened with practically no loss in yield and no perceptible effect on the other physical properties, for example, the melting point.

In accordance with the process of this invention the treatment may be carried out on the polymerized rosin in the molten condition or it may be carried out on the polymerized rosin dissolved in a suitable organic solvent. After the treatment with nascent hydrogen is completed, the polymerized rosin or the polymerized rosin solution may be washed to remove water-soluble materials and filtered to remove any suspended matter. In the case of treatment of the polymerized rosin in solution, the polymerized rosin of improved color may then be recovered by evaporation of the solvent.

The polymerized rosins treated by the method in accordance with this invention may be those derived from any of the various grades of wood or gum rosin. Crude rosins, heat-treated rosins, solvent refined rosins or distilled rosins polymerized by any of the methods known such as, for example, by treatment of the rosins with various catalysts, as sulfuric acid, boron trifluoride, etc., or by treatment of the rosins with a high voltage, high frequency discharge, etc. may be used in the process of this invention. It is desirable, in general, to treat a rosin from which most of the color bodies have been removed if a refined rosin of extremely pale color is desired. It will be found, however, that relatively pale color may be obtained by treatment of a polymerized FF wood rosin in accordance with the process of this invention.

Polymerized gum rosins made from any of the usual grades of gum rosin on the market are well adapted for treatment in accordance with this invention and provide refined polymerized rosins of appreciably improved color.

As solvents for the polymerized rosin, where the treatment is carried out on the polymerized rosin in solution, any solvent for the rosin which is itself inert in the treatment may be employed. Among such solvents are, for example, monocyclic aromatic hydrocarbons, such as benzol, toluol, xylol, etc.; petroleum hydrocarbons, such as gasoline, V. M. and P. naphtha, hexane, heptane, etc.; hydrogenated petroleum hydrocarbons, such as those known in the trade as "Solvesso" solvents; and solvents such as ethylene dichloride, carbon tetrachloride, cyclohexane, methylcyclohexane, etc. Where the treatment is carried out on the polymerized rosin in solution, the concentration of the polymerized rosin in the solvent is not critical and may be selected so as to provide adequate workability of the solution. Generally speaking, a concentration within the range of about 5% to about 80% by weight may be used, but preferably the concentration will fall within the range of about 20% to about 50% by weight.

The nascent hydrogen for use in the treatment of polymerized rosin in accordance with this invention may be derived by any of the well-known procedures for generating nascent hydrogen. Preferably, the nascent hydrogen may be provided by the reaction of an acid reactant with a metal above hydrogen in the electromotive series. The acid reactant may be either an acid or an acid salt or a mixture thereof. Among the acid reactants which may be used are, for example, sulfuric acid, phosphoric acid, acetic acid, sodium acid sulfate, monosodium acid phosphate, disodium acid phosphate, monopotassium acid phosphate, dipotassium acid phosphate, calcium acid phosphate, lithium acid phosphate, etc. Any of the metals above hydrogen in the electromotive series may be employed. It will be preferable, however, to use such metals which form salts having no appreciable discoloring action on the polymerized rosin. The metals will be employed preferably, though not necessarily, in a finely divided form. Use of metals such as, for example, cadmium, aluminum, manganese, tin and zinc is very desirable. Zinc in the form of zinc dust, mossy zinc or zinc powder is particularly well adapted to the process. It will be desirable that at least a small amount of water or of some other ionizing solvent be present to accelerate the refining action. Use of an acid or of the hydrate of an acid salt will provide the desired ionizing effect. It will be understood that the acid reactant and the metal are both in contact with the polymerized rosin during the treatment.

The nascent hydrogen may likewise be produced electrolytically. When using nascent hydrogen produced by electrolysis the polymerized rosin dissolved in a solvent may, for example, be placed in a suitable electrolytic cell, an acid solution or an aqueous salt solution may then be added to provide ionization and a direct current may then be passed through the cell for a length of time dependent on the current and the degree of refining desired.

It is desirable to employ vigorous agitation in carrying out the treatment to obtain thorough contact of the reactants and to accelerate the refining action. The speed with which the polymerized rosin becomes refined is also dependent on the temperature employed in the treatment. While the treatment may be carried out at room temperature with polymerized rosin dissolved in a solvent the rate of refining is rather slow for practical purposes. It is preferable to carry out the treatment at elevated temperatures and temperatures as high as 140° C. have been found to be satisfactory although higher temperatures are possible. A temperature within the range of about 70° C. to about 125° C. is preferable. When carrying out the treatment on the rosin in solution, it is convenient to carry out the treatment at the reflux temperature of the solvent. Where the treatment is to be carried out above the normal boiling point of the solvent, use of superatmospheric pressure is resorted to. The pressures employed are in no way limiting on the process and the equipment employed will generally determine the maximum pressure which is practical.

The time of treatment of the polymerized rosin may be varied to provide the result desired. The time necessary to provide satisfactory refining of the polymerized rosin will be dependent on such factors as the amount of color bodies present in the polymerized rosin, the temperature of treatment, the amount of nascent hydrogen utilized, etc. For this reason it is impossible to state any definite time necessary, except in relation to a given set of conditions. The examples which follow serve to illustrate the time of treatment which may be used in each particular case.

The amount of acid reactant used for producing nascent hydrogen, when this method of generating nascent hydrogen is employed, may vary over a wide range, depending on such factors as the particular acid reactant used, the degree of refining desired, the particular conditions of treatment, as well as other factors. Assuming the acid reactant to be on an anhydrous basis, ratios of polymerized rosin to acid reactant as high as 40 to 1 on a weight basis have been used. In general, however, ratios varying between 10 of polymerized rosin to 1 of acid reactant down to 1 of polymerized rosin to 1 or more of acid reactant are desirable. A preferred ratio is approximately 2 of polymerized rosin to 1 of acid reactant.

The concentration of the acid reactant, that is, in terms of an aqueous solution thereof, may also be varied.

With sulfuric acid as the acid reactant, for example, aqueous solutions thereof varying in strength from about 3% to about 95% sulfuric acid may be used, but in general aqueous solutions of sulfuric acid varying from about 3% to about 50% will be preferable. With sodium acid sulfate, for example, a hydrate such as the monohydrate, on an aqueous solution containing from about 10 per cent of sodium acid sulfate, up to a saturated solution thereof may be used.

When carrying out the treatment at elevated temperatures and under superatmospheric pressure the concentrations of the acid reactants used may be about the same, although in general it will be found that more dilute solutions may be used.

The amount of metal above hydrogen in the electromotive series which is employed is not particularly critical. It will be preferable, however, to have an amount of such metal present which will be an excess over the theoretical amount required to react with the acid reagent present.

As illustrative of the improved process of refining polymerized rosin in accordance with this invention the examples appearing below are cited as typical of the various embodiments. The colors shown in the examples are the Lovibond glass colors measured on ⅞" cubes of the polymerized rosins.

EXAMPLE 1

Two hundred and fifty parts by weight of a 20 per cent by weight solution in benzol of a polymerized FF wood rosin polymerized by means of 95 per cent sulfuric acid were refluxed with 30 parts by weight of sodium acid sulfate monohydrate and 20 parts by weight of zinc dust for one hour. The polymerized rosin solution was then washed with water, filtered and the solvent evaporated in a carbon dioxide atmosphere. There remained 50 parts by weight of refined polymerized rosin, indicating no loss in the process. The improved color of the refined product is evident from the following table containing the analytical date on the polymerized rosin before and after the refining treatment.

Table I

|  | Polymerized FF wood rosin | Refined polymerized FF wood rosin |
|---|---|---|
| Color | 80 amber +130 red | 40 amber+5.5 red. |
| Grade (U. S. standard type) | E | H. |
| Melting point (drop) | 98.5° C | 101.5° C. |
| Acid number |  | 153. |
| Gasoline insoluble | 1.2% | 1.1%. | rosin solution were treated. The amounts of zinc and acid reactant used, the temperature of treatment and the analyses of the refined polymerized rosins recovered are shown in the table. In each treatment the ingredients were agitated vigorously either through the reflux action or by mechanical agitation in the two cases where the treatment was carried out above the reflux temperature. Each treatment was for one hour and after each treatment the refined product was recovered as in the preceding examples.

Table III

| Sample No. | Parts by weight | | Analysis of product | | | |
|---|---|---|---|---|---|---|
|  | Acid reactant | Zinc dust (Parts) | Temp. | Color | Grade | M. P. (°C) |
| 1 | 2770 parts 3% H$_2$SO$_4$ sol'n. | 10 | 112° C | 17 amber | WW | 93.5 |
| 2 | 500 parts 10% NaHSO$_4$ sol'n. | 20 | Reflux | 30 amber | N | 93.5 |
| 3 | 100 parts 50% NaHSO$_4$ sol'n. | 20 | do | 10 amber | X | 93.0 |
| 4 | 100 parts 50% H$_3$PO$_4$ sol'n. | 20 | do | 18 amber | WW | 94.0 |
| 5 | 1500 parts 3% H$_2$SO$_4$ sol'n. | 20 | do | 35 amber | N | 95.5 |
| 6 | 100 parts 50% CH$_3$COOH sol'n. | 20 | do | 26 amber | WG | 93.5 |
| 7 | 237 parts 35% NaHSO$_4$ sol'n. | 10 | 112° C | 8 amber | X | 93.0 |
| 8 | Unrefined polymerized K rosin 40A+1.75R |  |  |  | K | 93.0 |

Example 2

Three thousand parts by weight of a 25% by weight unwashed benzol solution of polymerized FF wood rosin obtained by polymerization of FF wood rosin with 95% sulfuric acid were heated with 1000 parts by weight of a 35% aqueous solution of sodium acid sulfate and 125 parts by weight of zinc dust in an autoclave with vigorous agitation at a temperature of 110° to 115° C. for one hour, the pressure being about 40 pounds per sq. in. The polymerized rosin solution was then decanted from the zinc dust, water washed to remove the acid salt and the refined polymerized rosin then recovered by evaporation of the solvent.

The refined product obtained had a very pale color considering the color of the polymerized rosin without the refining treatment. Table II below shows the comparison of the polymerized FF wood rosin before and after the treatment. There was no loss of yield in the treatment.

Table II

|  | Polymerized FF wood rosin | Refined polymerized FF wood rosin |
|---|---|---|
| Color | 40 amber+10.5 red | 21 amber. |
| Grade | G | WG. |
| Melting point (drop) | 94.5° C | 96° C. |
| Acid number |  | 159. |

Example 3

Different portions of a 25 per cent by weight unwashed benzol solution of polymerized K wood rosin obtained by polymerization of K wood rosin with 95% sulfuric acid were subjected to treatment with zinc dust and several types of acid reactants as illustrated in Table III below. In each case 250 parts by weight of the polymerized

Example 4

Three hundred parts by weight of a 25 per cent by weight solution in cyclohexane of a polymerized wood rosin grading K in color, polymerized by means of 95 per cent sulfuric acid were refluxed for one hour with 24 parts by weight of zinc dust and 36 parts by weight of sodium acid sulfate monohydrate. The refined polymerized rosin was then recovered as in the preceding example. The color of the refined product was 6 Amber and its melting point was 85.5° C.

Example 5

Four hundred and fifty parts by weight of a 25 per cent by weight solution in gasoline of a polymerized wood rosin grading K in color, polymerized by means of 95 per cent sulfuric acid were refluxed for one hour with 36 parts by weight of zinc dust and 54 parts by weight of sodium acid sulfate monohydrate. The refined polymerized rosin was then recovered as in the preceding examples. The color of the refined product was 4 Amber and its melting point was 89.5° C.

Example 6

A 25 per cent by weight benzol solution of polymerized K gum rosin polymerized by means of 95 per cent sulfuric acid was treated by several different procedures in accordance with this invention as shown below, the refined product being recovered in each case as in the preceding examples:

(1) 300 parts by weight of the solution were refluxed for 1 hour with 24 parts by weight of zinc dust and 36 parts by weight of sodium acid sulfate monohydrate.

(2) 300 parts by weight of the solution were refluxed for 1 hour with 50 parts by weight of a 50% aqueous solution of sodium acid sulfate and 20 parts by weight of zinc dust.

(3) 300 parts by weight of the solution were refluxed for 1 hour with 50 parts by weight of a 10% aqueous solution of sodium acid sulfate and 20 parts by weight of zinc dust.

(4) 3000 parts by weight of the solution were agitated in an autoclave at a temperature of about 112° C. for 83 minutes with 1000 parts by weight of a 35% aqueous solution of sodium acid sulfate and 125 parts by weight of zinc dust. The pressure was about 40 lbs. per square inch.

The refined polymerized K gum rosin obtained in each of the above treatments had the characteristics shown below in Table IV. The unrefined polymerized rosin is included for purposes of comparison.

*Table IV*

| Sample No. | Color | Grade | Melting point drop |
|---|---|---|---|
| | | | °C. |
| 1 | 5 amber | X | 103 |
| 2 | 5 amber | X | 102.5 |
| 3 | 20 amber | WG | 103 |
| 4 | 6 amber | X | 101 |
| Unrefined poly. rosin | 38 amber | N | 103 |

EXAMPLE 7

Two hundred and fifty parts by weight of a 25 per cent by weight unwashed solution in benzol of polymerized K wood rosin obtained by polymerizing K wood rosin with 95 per cent sulfuric acid were refluxed for 1 hour with 35 parts by weight of a 50 per cent aqueous solution of sodium acid sulfate and 20 parts by weight of mossy cadmium. The refined polymerized rosin was then recovered as in the preceding examples. The resulting product had a color of 21 Amber and a melting point of 93° C. compared with a color of 40 Amber+1 Red and a melting point of 92° C. for the unrefined polymerized rosin.

EXAMPLE 8

The procedure of Example 7 was repeated with use of tin in place of the cadmium. The resulting product also had a color of 21 Amber and a melting point of 93° C.

EXAMPLE 9

A 25 per cent by weight solution of polymerized K wood rosin in benzol obtained by ploymerizing K wood rosin with 95 per cent sulfuric acid was refined at room temperature by means of nascent hydrogen generated electrolytically by passing the current of 13 dry cell batteries through the solution using a rotating cathode and with the anode arranged so that oxygen did not enter the body of the solution. A salt solution was added to provide proper ionization. The refined polymerized rosin recovered by evaporation of the solvent had a color of 20 Amber and a melting point of 93° C. compared with a color of 40 Amber+1 Red and a melting point of 93° C. for the unrefined polymerized rosin.

EXAMPLE 10

The procedure of Example 9 was repeated with use of 25 dry cells, a temperature of 60° C. and with sulfuric acid in place of the salt solution to provide ionization. The resulting refined product had a color of 18 Amber and a melting point of 94° C.

The process of refining polymerized rosin in accordance with this invention may also be carried out as a continuous process, if desired. Thus, for example, the polymerized rosin solution may be treated with the acid reactant and the metal above hydrogen in the electromotive series in a suitable vessel while additional polymerized rosin solution is fed into the vessel continuously and refined polymerized rosin solution withdrawn from the vessel at substantially the same rate. The acid reagent and metal may be replenished as necessary and the refined solution passed to a continuous evaporator for removal of the solvent.

The many advantages of our improved process for refining polymerized rosin will be readily apparent from the above description and examples. It will be obvious that the process is both extremely simple and economical. The color improvement of the polymerized rosin obtained is remarkable, particularly when it is considered that no loss in yield is encountered in the treatment. In previous methods of refining polymerized rosin a considerable loss in yield has always been evident.

It is to be understood that the term "refining" used throughout this invention refers particularly to the color improvement of polymerized rosin and not necessarily to a separation of the polymerized rosin into light-colored and dark-colored fractions.

It will also be understood that the details and examples hereinbefore set forth are illustrative only, and that the invention as broadly described and claimed is in no way limited thereby.

What we claim and desire to protect by Letters Patent is:

1. A process for refining polymerized rosin which comprises treating polymerized rosin with nascent hydrogen in the presence of an acidic reactant containing ionizable hydrogen and in the presence of at least a small amount of water.

2. A process for refining polymerized rosin which comprises treating polymerized rosin dissolved in a suitable solvent with nascent hydrogen in the presence of an acidic reactant containing ionizable hydrogen and in the presence of at least a small amount of water.

3. A process for refining polymerized rosin which comprises treating polymerized rosin dissolved in a suitable solvent with nascent hydrogen formed by the reaction of an acidic reactant containing ionizable hydrogen and a metal above hydrogen in the electromotive series in contact with said polymerized rosin solution and in the presence of at least a small amount of water.

4. A process for refining polymerized rosin which comprises treating polymerized rosin dissolved in a suitable solvent with nascent hydrogen formed by the reaction of an acid and a metal above hydrogen in the electromotive series in contact with said polymerized rosin solution and in the presence of at least a small amount of water.

5. A process for refining polymerized rosin which comprises treating polymerized rosin dissolved in a suitable solvent with nascent hydrogen formed by the reaction of sulfuric acid and a metal above hydrogen in the electromotive series in contact with said polymerized rosin solution and in the presence of at least a small amount of water.

6. A process for refining polymerized rosin which comprises treating polymerized rosin dissolved in a suitable solvent with nascent hydrogen formed by the reaction of zinc and an aqueous solution of sulfuric acid having a concentration ranging from about 3% to about 95% sulfuric acid in contact with said polymerized rosin solution.

7. A process for refining polymerized rosin which comprises treating polymerized wood rosin dissolved in a suitable solvent with nascent hydrogen formed by the reaction of zinc and an aqueous solution of sulfuric acid having a concentration ranging from about 3% to about 95% sulfuric acid in contact with said polymerized wood rosin solution.

8. A process for refining polymerized rosin which comprises treating polymerized gum rosin dissolved in a suitable solvent with nascent hydrogen formed by the reaction of zinc and an aqueous solution of sulfuric acid having a concentration ranging from about 3% to about 95% sulfuric acid in contact with said polymerized gum rosin solution.

9. A process for refining polymerized rosin which comprises treating polymerized rosin dissolved in a suitable solvent with nascent hydrogen formed by the reaction of an acid salt and a metal above hydrogen in the electromotive series in contact with said polymerized rosin solution and in the presence of at least a small amount of water.

10. A process for refining polymerized rosin which comprises treating polymerized rosin dissolved in a suitable solvent with nascent hydrogen formed by the reaction of sodium acid sulfate and a metal above hydrogen in the electromotive series in contact with said polymerized rosin solution and in the presence of at least a small amount of water.

11. A process for refining polymerized rosin which comprises treating polymerized rosin dissolved in a suitable solvent with nascent hydrogen formed by the reaction of zinc and a hydrate of sodium acid sulfate in contact with said polymerized rosin solution and in the presence of at least a small amount of water.

12. A process for refining polymerized rosin which comprises treating polymerized rosin dissolved in a suitable solvent with nascent hydrogen formed by the reaction of sodium acid sulfate monohydrate and zinc in contact with said polymerized rosin solution and in the presence of at least a small amount of water.

13. A process for refining polymerized rosin which comprises treating polymerized rosin dissolved in a suitable solvent with nascent hydrogen formed by the reaction of zinc and an aqueous solution of sodium acid sulfate in contact with said polymerized rosin solution.

14. A process for refining polymerized wood rosin which comprises treating polymerized wood rosin dissolved in a suitable solvent with nascent hydrogen formed by the reaction of zinc and an aqueous solution of sodium acid sulfate in contact with said polymerized wood rosin solution.

15. A process for refining polymerized gum rosin which comprises treating polymerized gum rosin dissolved in a suitable solvent with nascent hydrogen formed by the reaction of zinc and an aqueous solution of sodium acid sulfate in contact with said polymerized gum rosin solution.

16. A process for refining polymerized rosin which comprises treating said polymerized rosin dissolved in a suitable solvent with nascent hydrogen formed by the reaction of an acidic reactant containing ionizable hydrogen and a metal above hydrogen in the electromotive series in contact with said polymerized rosin solution and in the presence of at least a small amount of water, said treatment being carried out at a temperature within the range of about 70° C. to about 125° C.

WILLIAM N. TRAYLOR.
CLELL E. TYLER.